United States Patent
Yoshimura

(10) Patent No.: US 8,211,558 B2
(45) Date of Patent: Jul. 3, 2012

(54) CROSSLINKED POLYMER ELECTROLYTE AND METHOD FOR PRODUCING SAME

(75) Inventor: Ken Yoshimura, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 860 days.

(21) Appl. No.: 11/910,289

(22) PCT Filed: Apr. 4, 2006

(86) PCT No.: PCT/JP2006/307524
§ 371 (c)(1),
(2), (4) Date: Oct. 1, 2007

(87) PCT Pub. No.: WO2006/107115
PCT Pub. Date: Oct. 12, 2006

(65) Prior Publication Data
US 2009/0274943 A1    Nov. 5, 2009

(30) Foreign Application Priority Data

Apr. 5, 2005 (JP) ................................. 2005-108289
Apr. 5, 2005 (JP) ................................. 2005-108290

(51) Int. Cl.
*H01M 8/10* (2006.01)
(52) U.S. Cl. ............. 429/33; 429/304; 521/27; 521/30; 521/31
(58) Field of Classification Search ............. 429/33, 429/304; 521/27, 30, 31
See application file for complete search history.

(56) References Cited

U.S. PATENT DOCUMENTS

| 5,438,082 | A | * | 8/1995 | Helmer-Metzmann et al. ............. 522/149 |
| 5,985,477 | A | * | 11/1999 | Iwasaki et al. ............. 429/493 |
| 6,087,031 | A |   | 7/2000 | Iwasaki et al. |
| 6,790,553 | B1 | * | 9/2004 | Yamamoto .............. 429/465 |
| 7,060,756 | B2 | * | 6/2006 | Jing et al. ............... 525/327.4 |
| 2006/0088749 | A1 | * | 4/2006 | Panambur et al. .......... 429/33 |
| 2006/0180796 | A1 |   | 8/2006 | Adachi et al. |

FOREIGN PATENT DOCUMENTS

| CA | 2215911 A | 3/1996 |
| JP | 6093114 A | 4/1994 |
| JP | 10021943 A | 1/1998 |
| JP | 10045913 A | 2/1998 |
| JP | 11-502249 A | 2/1999 |
| JP | 2000-188013 A | 7/2000 |
| JP | 2000-281819 A | 10/2000 |
| JP | 2002-8680 A | 1/2002 |
| JP | 2003-297145 A | 10/2003 |
| JP | 2004-207107 A | 7/2004 |
| JP | 2004-263051 A | 9/2004 |
| JP | 2004269599 | 9/2004 |
| JP | 2004-339337 | * 12/2004 |
| JP | 2004-339337 A | 12/2004 |
| JP | 2005-142014 A | 6/2005 |
| WO | WO 2004/066428 | 8/2004 |
| WO | WO-2006/107115 A1 | * 10/2005 |
| WO | WO-2006/107115 A1 | * 10/2006 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

There are provided a new crosslinked polymer electrolyte excellent in water resistance and solvent resistance, high in heat resistance, inexpensive and low in methanol permeability, and suitable for the proton conductive membrane of a fuel cell, by means of the crosslinked polymer electrolyte obtained by the following (1) or (2), and its production method.

(1) A compound having two or three or more reactive groups is reacted with a polymer electrolyte.

(2) A compound having two or three or more reactive groups is reacted with a polymer to obtain a crosslinked polymer and then an ion exchange group is introduced into the resultant polymer.

18 Claims, No Drawings

CROSSLINKED POLYMER ELECTROLYTE AND METHOD FOR PRODUCING SAME

TECHNICAL FIELD

The present invention relates to a crosslinked polymer electrolyte, specifically a crosslinked polymer electrolyte suitably used as a fuel cell, and its production method.

BACKGROUND ART

Perfluoroalkyl sulfonic acid polymer electrolytes have been conventionally primarily used as proton conductive polymer electrolytes used for solid polymer fuel cells due to their excellent characteristics as fuel cells; however, this material is expensive.

In addition, although hydrogen and methanol are expected to take a prospective view as fuel used for fuel cells, a fuel cell by means of the above perfluoroalkyl sulfonic acid polymer and using methanol as fuel exhibits high permeability of the perfluoroalkyl sulfonic acid polymer to methanol, so the voltage and output are decreased.

In such situations, polymer electrolytes substituted for perfluoroalkyl sulfonic acid polymer materials, which are inexpensive and hardly permeate methanol, have been recently actively developed. Of these, materials having excellent heat resistance, in which a sulfonic acid group is introduced into an aromatic polyether having a high film strength are taken as a prospective view and, for example, polymer electrolytes of sulfonated polyether ketones (National Publication of International Patent Application No. 11-502249), sulfonated polyether sulfones (Japanese Patent Laid-Open Nos. 10-45913 and 10-21943) are proposed.

In addition, although polymer electrolytes crosslinked by radiation are recently disclosed from the viewpoints of permeation restraint of methanol and water resistance improvement (Japanese Patent Application Laid-Open No. 2004-269599), large-scale facilities are required for crosslinking by radiation and a membrane suffers from deterioration by radiation.

Furthermore, although a method is proposed that carries out amidation by use of an amine component for crosslinking (Japanese Patent Application Laid-Open No. 6-93114), an equivalent of a group attributable to proton conduction is decreased and the group is readily subjected to hydrolysis.

DISCLOSURE OF THE INVENTION

An object of the present invention is to provide a new crosslinked polymer electrolyte that is excellent in water resistance and solvent resistance, high in heat resistance, inexpensive, low in methanol permeability, and suitable for a proton conductive membrane of a fuel cell, and its production method.

The present inventors have diligently studied to attain the above object and, as a result, completed the present invention.

Namely, the present invention relates to [1] a crosslinked polymer electrolyte obtained by the following (1) or (2).

(1) A compound having two or three or more reactive groups is reacted with a polymer electrolyte.

(2) A compound having two or three or more reactive groups is reacted with a polymer to obtain a crosslinked polymer, and then an ion exchange group is introduced into the resultant polymer.

Moreover, the present invention relates to [2] the crosslinked polymer electrolyte described in [1], wherein the compound having two or three or more reactive groups is reacted with the polymer electrolyte or the polymer in the temperature range of from 50 to 300° C.; [3] the crosslinked polymer electrolyte described in [2], wherein the compound having two or three or more reactive groups is reacted with the polymer electrolyte or the polymer in the temperature range of from 100 to 200° C.; [4] the crosslinked polymer electrolyte described in [1], wherein a molecular weight of the compound having two or three or more reactive groups is 500 or less; [4] the crosslinked polymer electrolyte described in [1], wherein the compound having two or three or more reactive groups is reacted with the polymer electrolyte or the polymer in the presence of an acidic catalyst; [5] the crosslinked polymer electrolyte described in [1], wherein a ratio of a crosslinking agent is from 0.5 to 50 wt % based on an amount of the polymer or polymer electrolyte; and [6] the crosslinked polymer electrolyte described in [1], wherein the compound having two or three or more reactive groups is reacted with the polymer electrolyte or the polymer in the presence of the acidic catalyst. Furthermore, the invention relates to [7] the crosslinked polymer electrolyte described in [1], wherein the compound having two or three or more reactive groups is at least one compound selected from the group consisting of the following formulae (i-1) to (i-5):

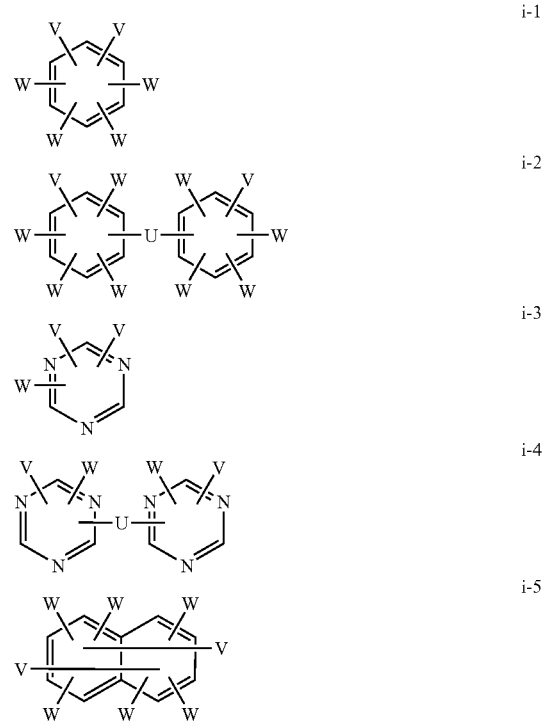

wherein, in formulae (i-1) to (i-5), V represents a reactive group, W represents a hydrogen atom, substituent or reactive group; in each formula, a plurality of Vs may be the same or different each other; in each formula, a plurality of Ws may be the same or different each other; U represents direct bond or a divalent group.

Additionally, the present invention relates to [8] the crosslinked polymer electrolyte described in [7] above, wherein V is each independently a halogen atom, hydroxymethyl group, alkoxymethyl group, vinyl group, allyl group, halogenated methyl group, alkoxymethylamino group, bis(alkoxymethyl)amino group, halogenated acyl group, isopropenyl group, or allyloxy group; [9] the crosslinked polymer electrolyte described in [7] above, wherein W is each independently a halogen atom, hydrogen atom, hydroxymethyl group, alkoxymethyl group, vinyl group, allyl group, halogenated methyl group, alkoxymethylamino group, bis(alkoxymethyl)amino group, halogenated acyl group, isopropenyl group, allyloxy group, hydroxyl group, carboxylic acid group, sulfonic acid group, amino group, amide group, nitro group, aldehyde group, nitrile group, ester group, alkyl group having 1 to 6 carbon atoms that may have a substituent, aryl group having 6 to 20 carbon atoms that may have a substituent, or aralkyl group having 7 to 20 carbon atoms that may have a substituent; and [10] the crosslinked polymer electrolyte described in [7] above, wherein U is each independently direct bond, —O—, —S—, —CO—, —COO—, —$SO_2$—, —$SO_3$—, phenylene group, biphenylylene group, anthrylene group, naphthylene group, aralkylene group having 7 to 12 carbon atoms, alkylene group having 1 to 20 carbon atoms, alkyleneoxy group having 1 to 20 carbon atoms, or alkylenesulfide group having 1 to 20 carbon atoms.

The invention relates to [11] the crosslinked polymer electrolyte described in [8] or [9] above, wherein at least 2 of Vs are hydroxylmethyl groups and W is a hydroxyl group; and [12] the crosslinked polymer electrolyte described in [11] above, wherein the compound having two or three or more reactive groups is 2,6-bis(hydroxymethyl)phenol or its derivatives.

Moreover, the invention relates to [13] the crosslinked polymer electrolyte described in [1] to [12] above, wherein the polymer electrolyte is at least one selected from the group consisting of (A) a polymer electrolyte in which an ion exchange group is introduced into a polymer comprising an aliphatic hydrocarbon in the main chain thereof, (B) a polymer electrolyte in which an ion exchange group is introduced into a polymer comprising an aliphatic hydrocarbon in which a portion or all of hydrogen atoms in the main chain is substituted by fluorine, (C) a polymer electrolyte in which an ion exchange group is introduced into a polymer having an aromatic ring in the main chain thereof, (D) a polymer electrolyte in which an ion exchange group is introduced into a polymer having an inorganic substance substantially not containing a carbon atom in the main chain thereof, (E) a polymer electrolyte containing a nitrogen atom in the main chain or side chain thereof and having an acidic compound introduced thereinto by ion bonding, and (F) a polymer electrolyte comprising copolymer of (A) to (E) and/or mixture thereof; [14] the crosslinked polymer electrolyte described in [1] to [13] above, wherein the polyelectrolyte contains a block copolymer having one or more blocks into which a sulfonic acid group is introduced and one or more blocks into which a sulfonic acid is not substantially introduced, and at least one block of all the blocks has an aromatic ring in the main chain thereof; [15] the crosslinked polymer electrolyte described in [1] to [13] above, wherein the ion exchange group is a cation exchange group; [16] the crosslinked polymer electrolyte described in [15], wherein the cation exchange group is a sulfonic acid group; [17] the crosslinked polymer electrolyte described in [16], wherein the sulfonic acid group is introduced thereinto by use of a sulfonating agent selected from concentrated sulfuric acid, chlorosulfonic acid and fuming sulfuric acid; and [18] the crosslinked polymer electrolyte described in [16], wherein a halogenated solvent is coexisted when the sulfonic acid group is introduced thereinto.

Furthermore, the invention relates to a crosslinked polymer electrolyte membrane comprising the above crosslinked polymer electrolyte, [19] a crosslinked polymer electrolyte membrane comprising the crosslinked polymer electrolyte described in [1] above; and [20] a crosslinked polymer electrolyte membrane obtained by the following (3) or (4).

(3) a compound having two or three or more reactive groups and a polymer electrolyte are dissolved in a solvent and a membrane is formed by use of the resultant solution, and then the resultant membrane is crosslinked.

(4) A compound having two or three or more reactive groups and a polymer are dissolved in a solvent, a membrane is formed by use of the resultant solution, the resultant membrane is crosslinked, and subsequently, an ion exchange group is introduced into the resultant membrane.

Additionally, the invention relates to [21] a crosslinked polymer electrolyte membrane—electrode assembly comprised of the polymer electrolyte membrane described in [19] or [20] above and the electrodes; and relates to [22] a cell comprising the crosslinked polymer electrolyte membrane described in [19] or [20] above—electrode assembly; [23] a cell comprising the crosslinked polymer electrolyte membrane—electrode assembly described in [22] above; [24] a fuel cell comprising the crosslinked polymer electrolyte membrane described in any of [19] or [20] above-electrode assembly; and [25] a fuel cell comprising the crosslinked polymer electrolyte membrane—electrode assembly described in [22] above.

In addition, the invention relates to [26] a method for producing a crosslinked polymer electrolyte comprising the following (1) or (2).

(1) A compound having two or three or more reactive groups is reacted with a polymer electrolyte.

(2) A compound having two or three or more reactive groups is reacted with a polymer electrolyte to obtain a crosslinked polymer, and an ion exchange group is introduced into the resultant crosslinked polymer.

Additionally, the invention relates to [27] the method for producing the crosslinked polymer electrolyte described in [26], wherein the compound having two or three or more reactive groups and the polymer electrolyte or a polymer are heated in the range of from 50° C. to 300° C.; [28] the crosslinked polymer electrolyte described in [27], wherein the compound having two or three or more reactive groups is reacted with the polymer electrolyte or the polymer in the temperature range of from 100° C. to 200° C.; [29] the crosslinked polymer electrolyte described in [26], wherein a molecular weight of the compound having two or three or more reactive groups is 500 or less; [30] the crosslinked polymer electrolyte described in [26], wherein a ratio of the crosslinking agent is from 0.5 to 50 wt % based on the amount of the polymer or polymer electrolyte; [31] the production method described in [26], wherein the compound having two or three or more reactive groups and the polymer electrolyte are dissolved in a solvent, a membrane is formed by use of the resultant solution, and then the resultant membrane is crosslinked, or the compound having two or three or more reactive groups and the polymer are dissolved in a solvent, a membrane is formed by use of the resultant solution, the resultant membrane is crosslinked, and then an ion exchange group is introduced into the resultant membrane; and [32] the production method described in [26], wherein an acidic catalyst is coexisted in heating.

BEST MODE FOR CARRYING OUT THE INVENTION

A crosslinked polymer electrolyte of the present invention relates to a crosslinked polymer electrolyte obtained by (1) or (2) described in the following.

(1) A compound having two or three or more reactive groups is reacted with a polymer electrolyte.

(2) A compound having two or three or more reactive groups is reacted with a polymer to obtain a crosslinked polymer and then an ion exchange group is introduced into the resultant polymer. The crosslinked polymer refers to a polymer in which polymer chains are connected to each other by means of bridged structure, and a weight-average molecular weight is substantially infinite ("Essential Polymer Science" published by Kodansha LTD., pp. 59-60, 1988).

A compound having two or three or more reactive groups used in the present invention causes crosslinking reaction to become a portion of bridged structure during crosslinking reaction described below. The reactive groups include groups selected from the group consisting of halogen atoms, hydroxymethyl groups, alkoxymethyl groups, vinyl groups, allyl groups, halogenated methyl groups, alkoxymethylamino groups, bis(alkoxymethyl)amino groups, halogenated acyl groups, isopropenyl groups and allyloxy groups.

The reactive group is preferably a halogen atom, hydroxymethyl group, vinyl group, allyl group, halogenated methyl group, bis(alkoxymethyl)amino group, isopropenyl group and allyloxy group, more preferably a halogen, hydroxymethyl group and bis(alkoxymethyl)amino group, particularly preferably a hydroxymethyl group.

A compound having two or three or more reactive groups used in the present invention preferably has a reactive group as mentioned above and one or two or more aromatic rings. The aromatic rings include benzene ring, condensed benzene rings, non-benzenoid aromatic rings and heterocyclic aromatic rings. The aromatic rings more preferably include aromatic rings having 3 to 14 carbon atoms. The aromatic rings having 3 to 14 carbon atoms include, for example, benzene ring, pyridine ring, triazine ring, pyrrole ring, indole ring, imidazole ring, furan ring, thiophene ring, naphthalene ring, quinoline ring, anthracene ring, phenanthrene ring, oxazole ring, and other rings. The above aromatic rings may have arbitrary substituents.

The compounds having 2 or 3 or more reactive groups more preferably include, for example, compounds represented by the following formulae (i-1) to (i-5):

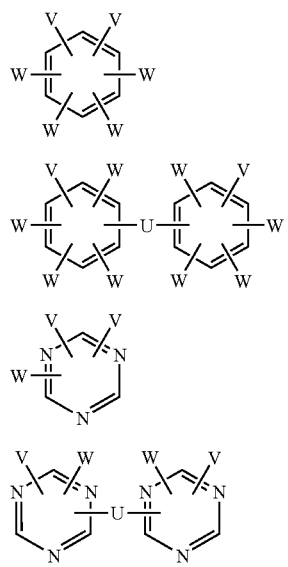

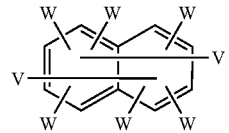

wherein, in the formulae (i-1) to (i-5), V represents a reactive group, and W represents hydrogen atom, a substituent or reactive group; in each formula, a plurality of Vs may be the same or different each other; in each formula, a plurality of Ws may be the same or different each other; and U represents direct bond or a divalent group.

V represents a reactive group, and examples of V include halogen atoms, hydroxymethyl groups, alkoxymethyl groups, vinyl groups, allyl groups, halogenated methyl groups, alkoxymethylamino groups, bis(alkoxymethyl) amino groups, halogenated acyl groups, isopropenyl groups, allyloxy groups and the like, preferably halogen atoms, hydroxymethyl groups, vinyl groups, allyl groups, halogenated methyl groups, bis(alkoxymethyl)amino groups, isopropenyl groups, and allyloxy groups, more preferably halogen atoms, hydroxymethyl groups, and bis(alkoxymethyl) amino groups, particularly preferably hydroxymethyl groups. Herein, the halogen atoms include F, Cl, Br and I.

W represents a hydrogen atom, reactive group or substituent, and examples of W include halogen atoms, hydrogen atoms, hydroxymethyl groups, alkoxymethyl groups, vinyl groups, allyl groups, halogenated methyl groups, alkoxymethylamino groups, bis(alkoxymethyl)amino groups, isopropenyl groups, allyloxy groups, halogenated acyl groups, hydroxyl groups, carboxylic acid groups, sulfonic acid groups, amino groups, amide groups, nitro groups, aldehyde groups, nitrile groups, ester groups, alkyl groups having 1 to 6 carbon atoms that may have a substituent, aryl groups having 6 to 20 carbon atoms that may have a substituent, and aralkyl groups having 7 to 20 carbon atoms that may have a substituent, preferably hydrogen atoms, hydrogen atoms, hydroxymethyl groups, alkoxymethyl groups, vinyl groups, allyl groups, halogenated methyl groups, alkoxymethylamino groups, bis(alkoxymethyl)amino groups, isopropenyl groups, allyloxy groups, halogenated acyl groups, hydroxyl groups, amino groups, alkyl groups having 1 to 6 carbon atoms that may have a substituent, aryl groups having 6 to 20 carbon atoms that may have a substituent, and aralkyl groups having 7 to 20 carbon atoms that may have a substituent, more preferably hydrogen atoms, hydrogen atoms, hydroxymethyl groups, alkoxymethyl groups, vinyl groups, allyl groups, halogenated methyl groups, alkoxymethylamino groups, bis (alkoxymethyl)amino groups, carboxylic acid halides, hydroxyl groups, amino groups, and particularly preferably hydrogen atoms, hydroxymethyl groups, bis(alkoxymethyl) amino groups, hydroxyl groups and amino groups. Herein, the halogen atoms include F, Cl, Br and I.

U represents direct bond or a divalent group, and examples of U include, for example, direct bonding, —O—, —S—, —CO—, —COO—, —SO$_2$—, —SO$_3$—, phenylene groups, biphenylylene groups, anthrylene groups, naphthylene groups, aralkylene groups having 7 to 12 carbon atoms, alkylene groups having 1 to 20 carbon atoms, alkyleneoxy groups having 1 to 20 carbon atoms, alkylenesulfide groups having 1 to 20 carbon atoms and the like.

The aralkylene groups include benzylene and the like, the alkylene groups include methylene groups, ethylene groups, propylene groups, and the like, the alkyleneoxy groups include methyleneoxy groups, ethyleneoxy groups, propyleneoxy groups, butyleneoxy groups, and the like, and the alkylesulfide groups include methylenesulfide groups, ethylenesulfide groups, propylenesulfide groups, butylenesulfide groups and the like. The hydrogen atoms in the hydrocarbon groups illustrated herein may be partially or totally substituted by fluorine atoms. Examples of U are preferably direct bond, —O—, —S—, —CH$_2$—.

Such compounds having two or three or more reactive groups include the following structural formulae (j-1) to (j-26) and the like:

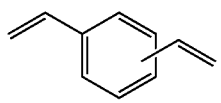
j-1

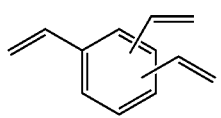
j-2

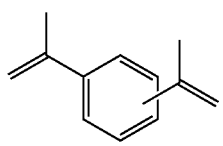
j-3

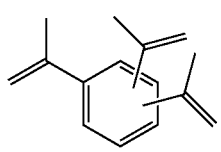
j-4

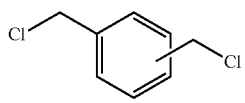
j-5

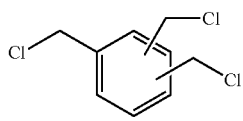
j-6

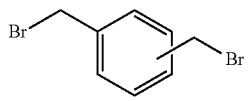
j-7

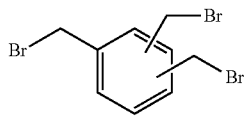
j-8

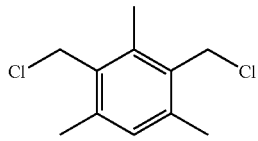
j-9

-continued

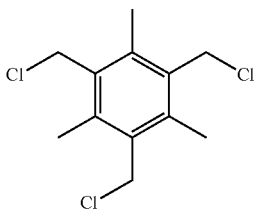
j-10

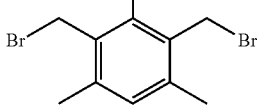
j-11

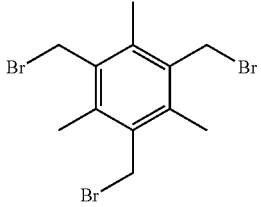
j-12

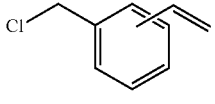
j-13

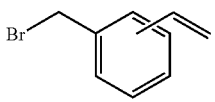
j-14

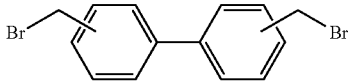
j-15

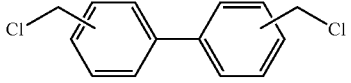
j-16

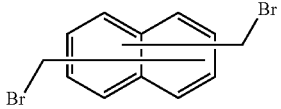
j-17

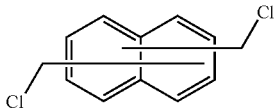
j-18

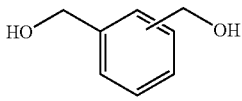
j-19

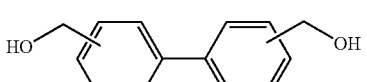
j-20

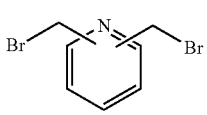
j-21

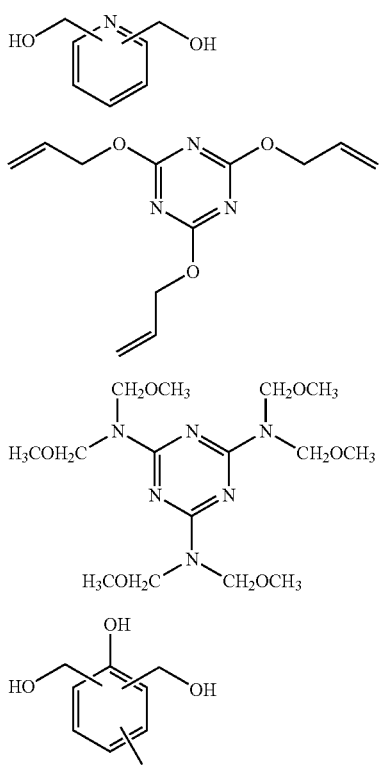

Of these, (j-23) to (j-25) are preferred, (j-25) is particularly preferred, and of these, 2,6-bis(hydroxymethyl)cresol is preferred.

The polymer electrolyte used in the present invention is not particularly limited so long as it is a polymer that can be used as an electrolyte, polymer electrolytes containing an ion exchange group, organic and inorganic hybrid electrolytes and the like can be used, and it is preferable that an ion exchange group is contained.

The ion exchange groups include, for example, cation exchange groups such as —SO$_3$H, —COOH, —PO(OH)$_2$, —POH(OH), —SO$_2$NHSO$_2$—, -Ph(OH) (Ph represents a phenyl group), oxocarbon groups represented by the following general formula (2):

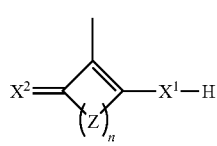

wherein $X^1$ and $X^2$ each independently represent —O—, —S— or —NR—, Z represents —CO—, —C(S)—, —C(NR)—, an alkylene group that may have a substituent or arylene group that may have a substituent; R in NR represents a hydrogen atom, alkyl group having 1 to 6 carbon atoms that may have a substituent or aryl group having 6 to 10 carbon atoms that may have a substituent, n represents the number of repeats, n represents an integer of from 0 to 10, n Zs may be the same or different; and anion exchange groups such as —NH2, —NHR, —NRR', —NRR'R"$^+$ and —NH$^{3+}$ (R, R' and R" each independently represent an alkyl group, cycloalkyl group, aryl group, or the like). A part or the whole ion exchange may form a salt with its counter ion.

In applications used for fuel cells, the ion exchange group is preferably a cation exchange group, more preferably —SO$_3$H, —PO(OH)$_2$, —POH(OH), —SO$_2$NHSO$_2$— or oxocarbon group, particularly preferably —SO$_3$H, —PO(OH)$_2$, or oxocarbon group, most preferably —SO$_3$H.

Representative examples of this polymer electrolyte include, for example, (A) a polymer electrolyte in which an ion exchange group is introduced into a polymer comprising an aliphatic hydrocarbon in the main chain thereof; (B) a polymer electrolyte in which an ion exchange group is introduced into a polymer comprising an aliphatic hydrocarbon in which a portion or all of hydrogen atoms in the main chain are substituted by fluorine; (C) a polymer electrolyte in which an ion exchange group is introduced into a polymer having an aromatic ring in the main chain thereof; (D) a polymer electrolyte in which an ion exchange group is introduced into a polymer comprising an inorganic substance substantially not containing a carbon atom in the main chain thereof; (E) a polymer electrolyte containing a nitrogen atom in the main chain or the side chain thereof and having an acidic compound introduced thereinto by ion bonding; (F) a polymer electrolyte comprising the above-described copolymer of (A) to (E) and/or a mixture thereof; and the like.

The above-described polymer electrolytes (A) include, for example, polyvinylsulfonic acid, polystyrenesulfonic acid, poly(α-methylstyrene)sulfonic acid, and the like.

The above-described polymer electrolytes (B) include polymers having perfluoroalkylsulfonic acid in its side chain and having a perfluoroalkyl in the main chain as represented by Nafion (registered trade mark of E.I.DuPont, the same hereinafter), sulfonic acid type polystyrene-graft-ethylene-tetrafluoroethylene copolymers composed of the main chain made by copolymerization of a carbonized fluorine-based vinyl monomer with a hydrocarbon-based vinyl monomer and a hydrocarbon-based side chain having a sulfonic acid group (ETFE, for example, Japanese Patent Application Laid-Open No. 9-102322), sulfonic acid type poly(trifluostyrene)-graft-ETFE membranes obtained by graft-polymerizing α,β,β-trifluorostyrene to a membrane prepared by copolymerization of a fluorine carbide-based vinyl monomer with a hydrocarbon-based vinyl monomer, and then introducing a sulfonic acid group thereinto to form a solid polymer electrolyte membrane (e.g., U.S. Pat. Nos. 4,012,303 and 4,605,685), and the like.

The above-described polymer electrolyte (C) may have a main chain having interrupted by a hetero atom such as an oxygen atom, and examples include polymer electrolytes produced by introducing an ion exchange group into each of polymers such as polyether ether ketone, polysulfone, polyethersulfone, poly(arylene ether), polyimide, poly((4-phenoxybenzoyl)-1,4-phenylene), polyphenylene sulfide and polyphenyl quinoxalene, sulfoarylated polybenzimidazole, sulfoalkylated polybenzimidazole, phosphoalkylated polybenzimidazole (e.g., Japanese Patent Application Laid-Open No. 9-110982), phosphonated poly(phenylene ether) (e.g., J. Appl. Polym. Sci., 18, 1969 (1974)), and the like.

The above-described polymer electrolytes (D) include a polymer electrolyte obtained by introducing an ion exchange group into polyphosphazene, polysiloxane having a phosphonic acid group described in Polymer Prep., 41, no. 1, 70 (2000) and the like.

The above-described polymer electrolytes (E) include, for example, polybenzimidazole containing phosphoric acid described in Japanese Patent Laid-Open No. 11-503262, and the like.

The above-described polymer electrolyte (F) may be a polymer electrolyte produced by introducing an ion exchange group into a random copolymer, a polymer electrolyte produced by introducing an ion exchange group into an alternating copolymer, or a polymer electrolyte produced by introducing an ion exchange group into a block copolymer. Concrete examples of the polymer electrolyte produced by introducing a sulfonic acid group into a random copolymer include polymer electrolytes described in Japanese Patent Application Laid-Open No. 11-116679, and the like. In the block copolymer, concrete examples of the block having a sulfonic group include, for instance, polymer electrolytes described in Japanese Patent Application Laid-Open No. 2001-250567, and the like.

Among the above described polymer electrolytes (A) to (F), (A) to (D) and (F) are preferred, (C) and (F) are more preferred, and (F) is particularly preferred. Even of (F), the polymer electrolyte preferably contains a block copolymer having one or more blocks into which a sulfonic acid group is introduced and one or more blocks into which a sulfonic acid group is not substantially introduced and in which at least one block of all the blocks has an aromatic ring in its main chain.

Herein, the block refers to a polymer in which two or more of one kind of repeating units are connected. Additionally, the block copolymer refers to a polymer in which two or more blocks are directly bonded or bonded via a connecting group, that is, a polymer containing a plurality of blocks comprised of two or more kinds of repeating units.

The above-described block into which a sulfonic acid group is introduced refers to a block in which, to any part of the repeating units constituting the block, sulfonic acid groups for one of the repeating units (a group expressed by —SO$_3$H) is bonded in an average number of 0.5 or more.

The bonding form of a sulfonic acid group to a repeating unit constituting a block is not particularly limited, and a block having a structure in which a sulfonic acid group is directly bonded to an aromatic ring is preferred since synthesis is comparatively easy.

On the other hand, the above-descried block into which a sulfonic acid group is not substantially introduced refers to a block in which the number of introduction of sulfonic acid group for one of the repeating units constituting the block is 0.1 or less on average.

Additionally, in addition to a block into which a sulfonic acid group is introduced and a block into which a sulfonic acid group is not substantially introduced, the block copolymer may or may not have a block in which the number of introduction of sulfonic acid groups per repeating unit constituting a block is from 0.1 or more to 0.5 or less on average.

The blocks the above into which a sulfonic acid group is introduced include, for example, polyphenylene ethers, polyphenylene sulfides, polyether ketones, polyether sulfones and copolymers thereof, into which a sulfonic acid group is introduced, preferably include polyphenylene ethers, polyether ketones, polyether sulfones and copolymers thereof, into which a sulfonic acid group is introduced, more preferably include polyphenylene ethers, polyether sulfones and copolymers thereof, into which a sulfonic acid group is introduced, particularly preferably include polyphenylene ethers, into which a sulfonic acid group is introduced.

Specific examples of the polyphenylene ether include poly (1,4-phenylene ether), poly(2-methyl-1,4-phenylene ether), poly(2,6-dimethyl-1,4-phenylene ether), poly(2-phenyl-1,4-phenylene ether), poly(2,6-diphenyl-1,4-phenylene ether), poly(2-methyl-1,3-phenylene ether), poly(2,6-dimethyl-1,3-phenylene ether), poly(2-phenyl-1,3-phenylene ether), poly (2,6-diphenyl-1,3-phenylene ether), and the like. Of these, poly(1,4-phenylene ether), poly(2-phenyl-1,4-phenylene ether) and poly(2,6-diphenyl-1,4-phenylene ether) are preferable, and poly(2-phenyl-1,4-phenylene ether) are furthermore preferable.

The blocks into which a sulfonic acid group is not substantially introduced include, for example, polyphenylene ethers, polyphenylene sulfides, polyether ketones, polyether sulfones and copolymers thereof, preferably include polyether ketones, polyether sulfones and copolymers thereof, more preferably include polyether sulfones.

The polyether sulfones include polyether sulfone, polyether ether sulfone, polysulfone, polyphenyl sulfone and the like, preferably include polyether sulfone.

A weight average molecular weight of the polymer electrolyte used in the present invention is normally roughly from 1,000 to 1,000,000, preferably roughly from 5,000 to 300,000. [Substance amount (mmol) of ion exchange group in polymer electrolyte]/[weight of polymer electrolyte (g)] is normally roughly from 0.05 to 5 mmol/g, preferably roughly from 0.1 to 3 mmol.

The polymer used in the present invention is not particularly limited and any structural polymer can be used. The examples include vinyl polymers, polysiloxanes, polyesters, polyimides, polyamides, polybenzoxazols, polybenzimidazoles, polyarylene ethers, polyarylenes, polyarylene sulfides, polyether ketones, polyether sulfones, polyphosphazenes, and copolymers thereof and mixtures thereof. Preferably, the polymers include a polymer containing an aromatic ring.

Such vinyl polymers, polysiloxanes and polyesters include, for example, in the following:

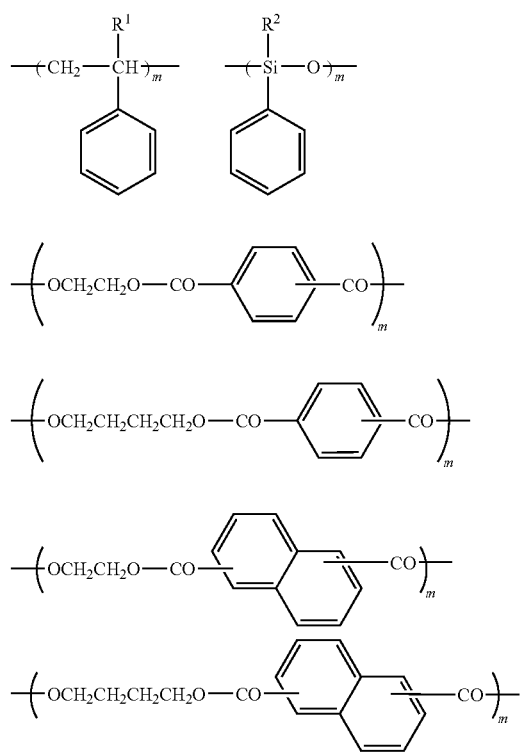

wherein R$^1$ and R$^2$ each independently represent a hydrogen atom, fluorine atom, chlorine atom, methyl group, trifluoromethyl group or phenyl group.

The polyimides include, for example, in the following.
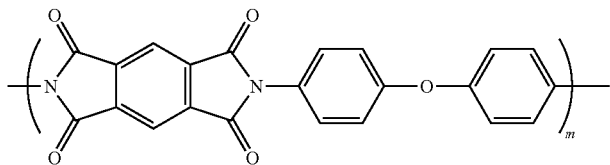
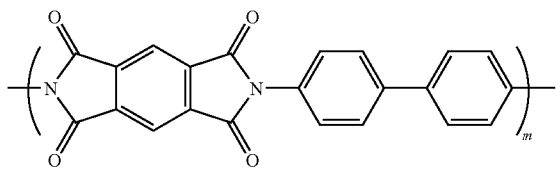
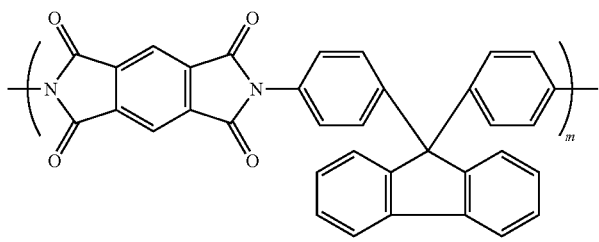
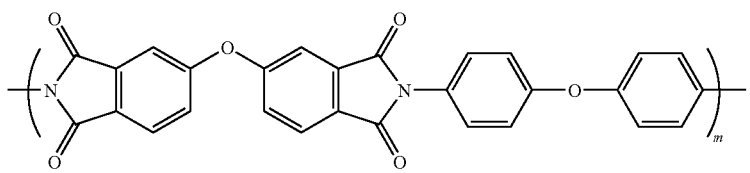
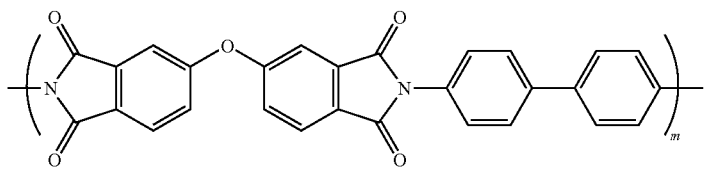
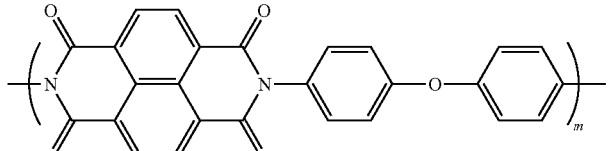
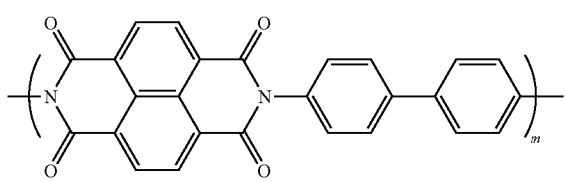
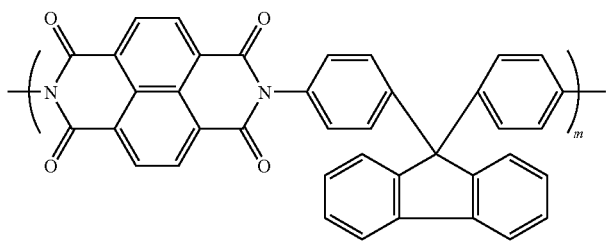

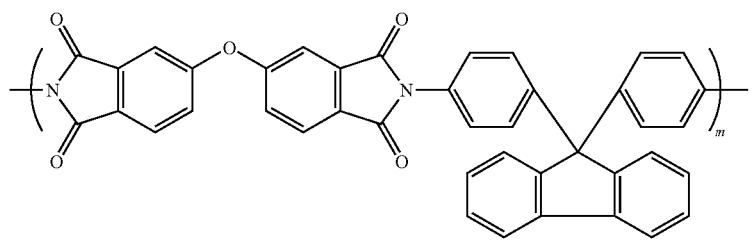
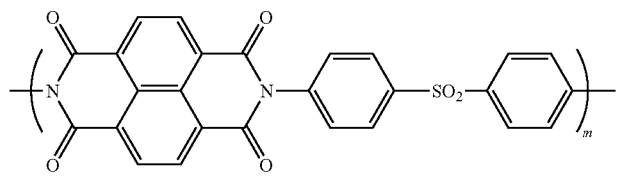
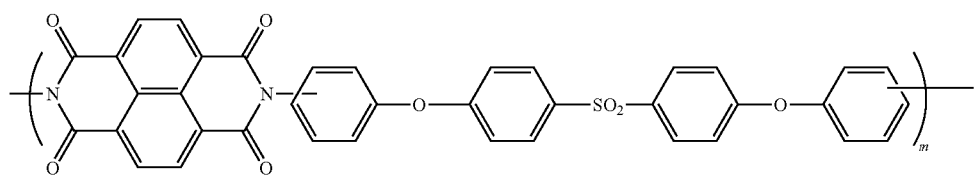
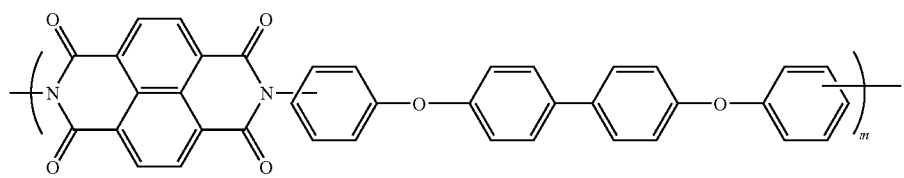
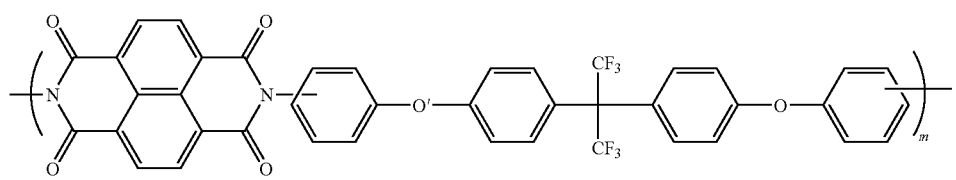
The polyamides, polybenzoxazoles, polybenzimidazoles and polyarylene ethers include, for example, in the following.
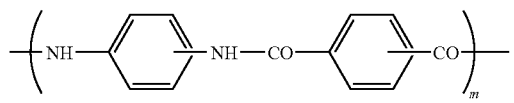
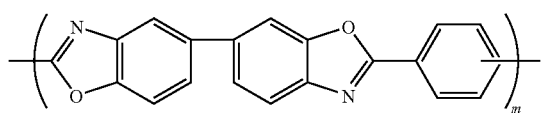
-continued
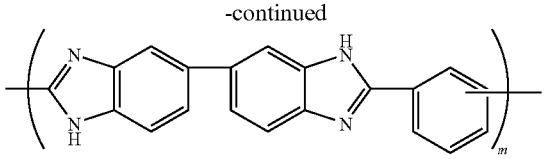
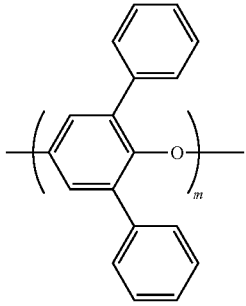

The polyarylenes include, for example, in the following.
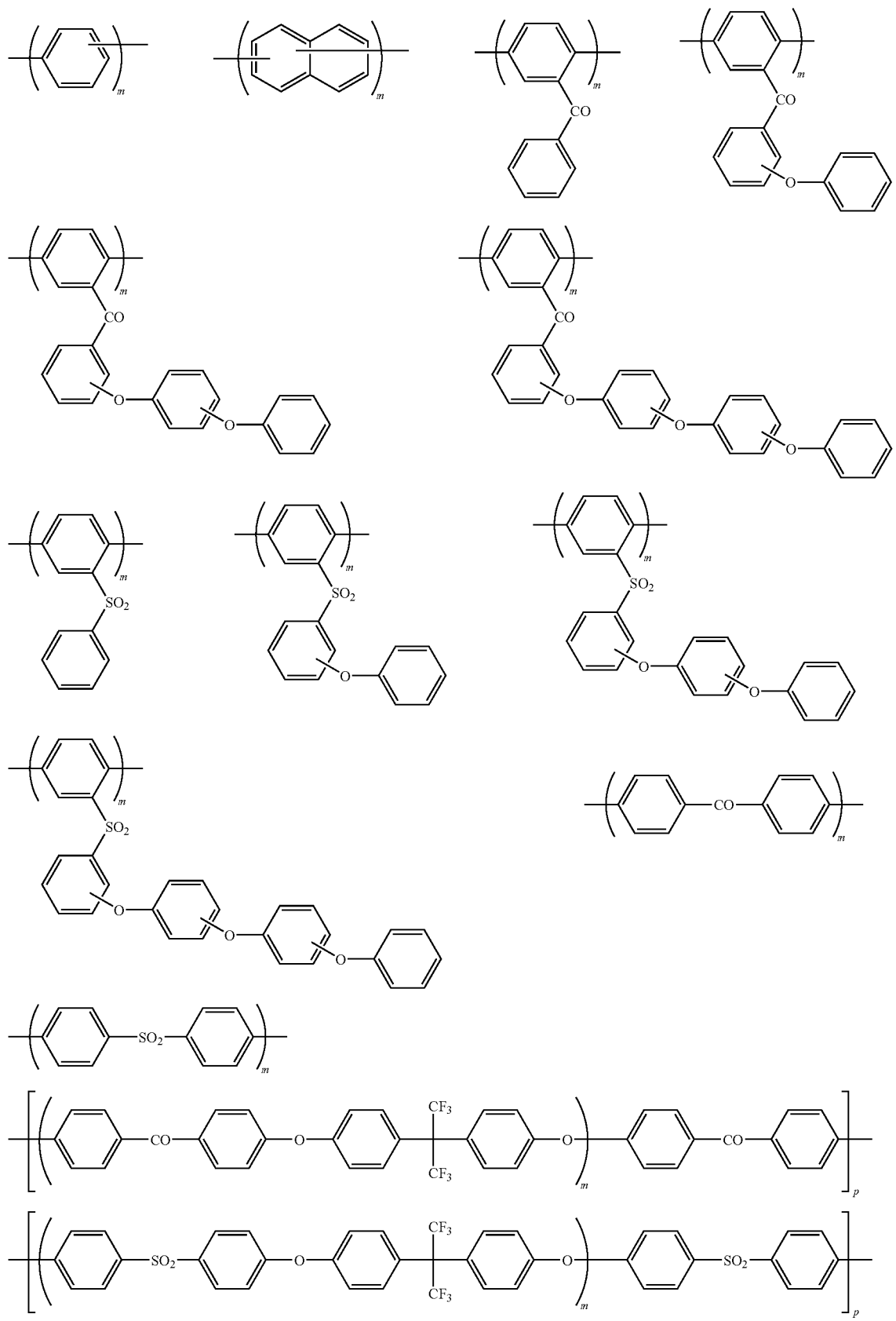

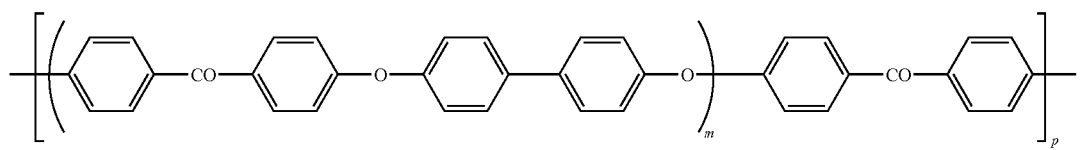
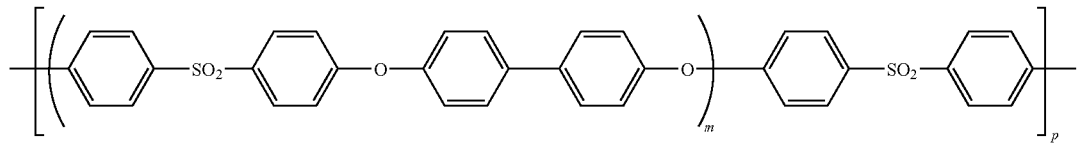
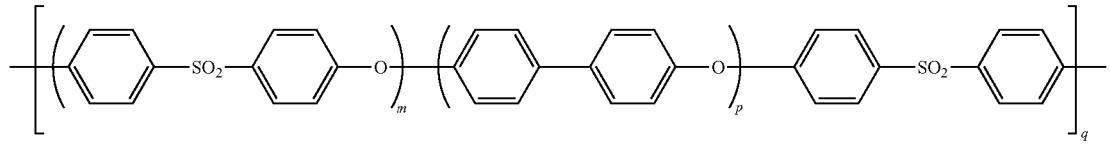
The polyether ketones include, for example, in the following and the like.
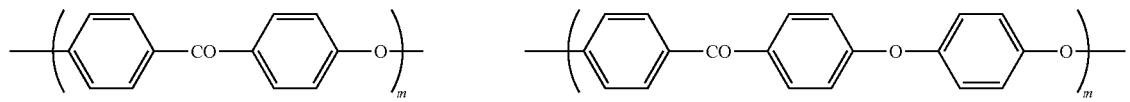
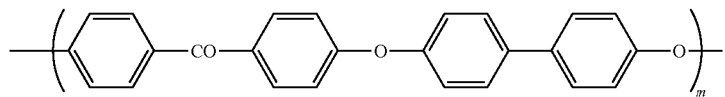
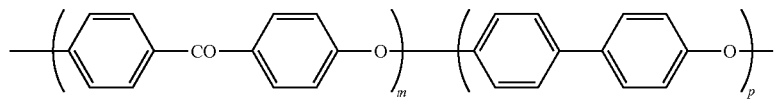
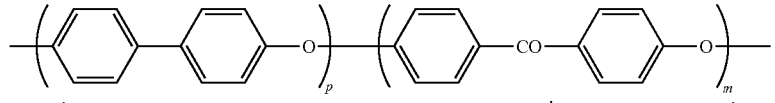
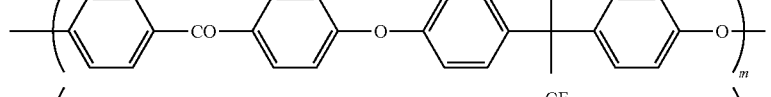
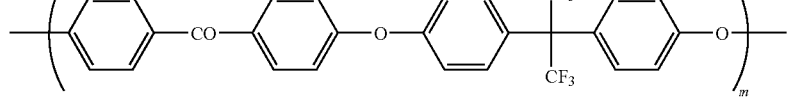
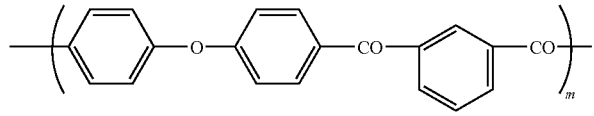
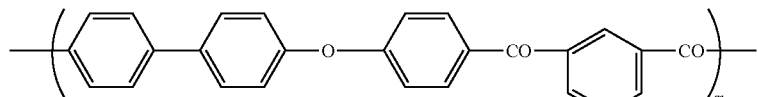
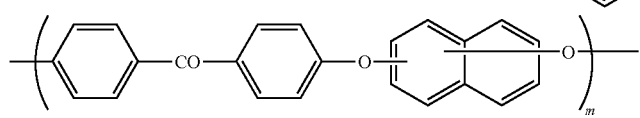

The polyether sulfones include, for example, in the following and the like.
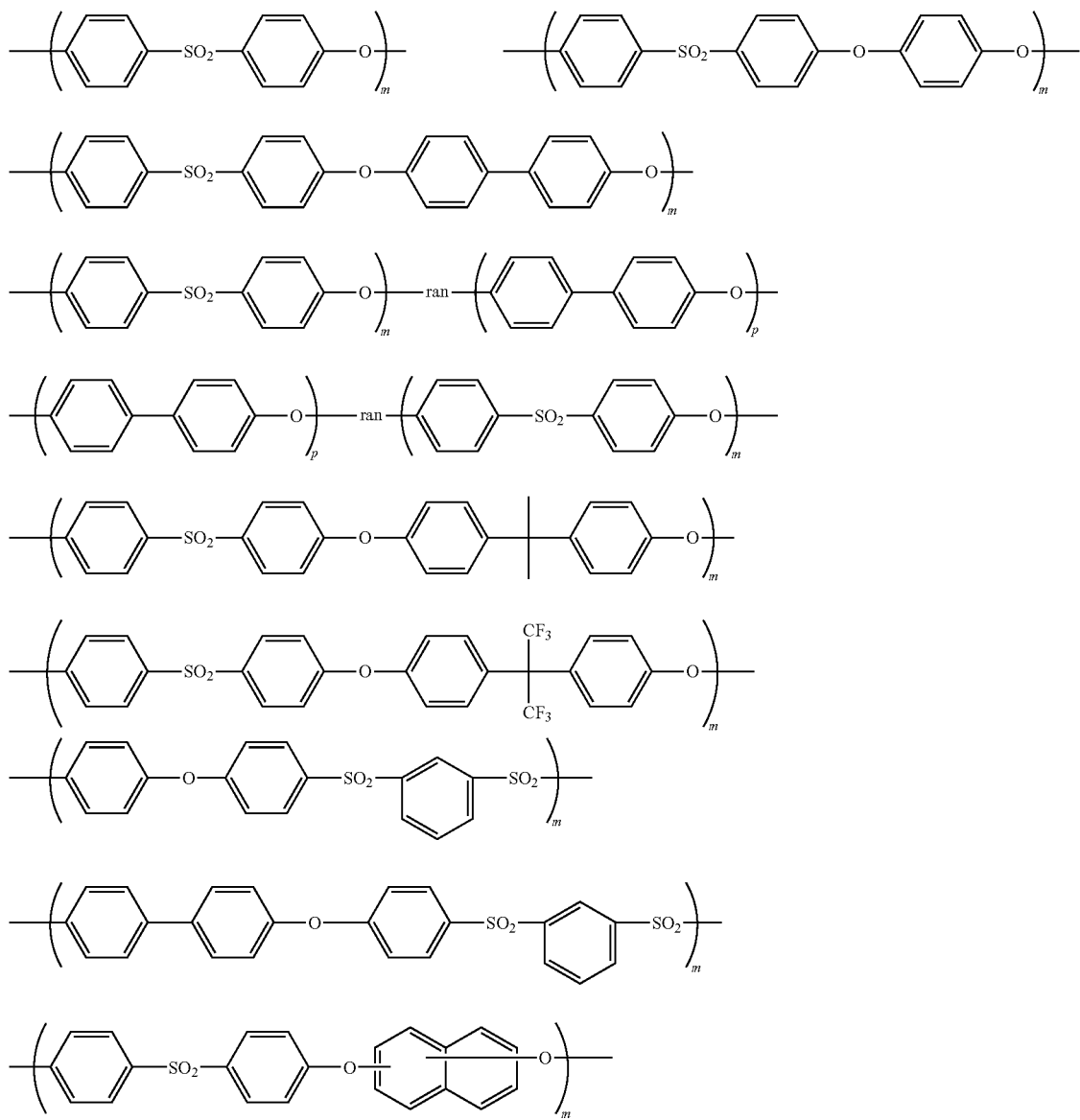
Moreover, the polyarylene sulfides, polyphosphazenes and polyphtharazines include, for example, the following and the like.
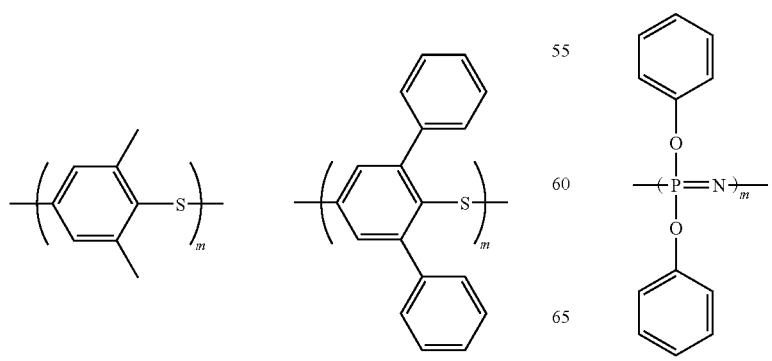
-continued

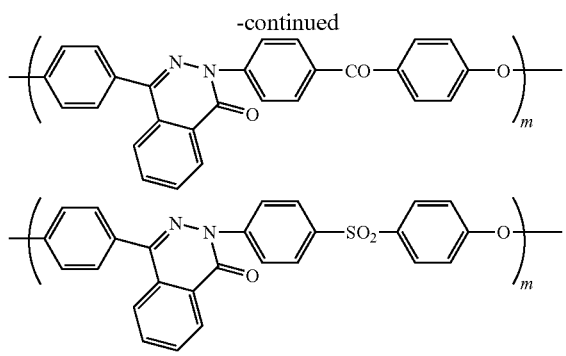

Of these polymers, preferred are polybenzoxazoles, polybenzimidazoles, polyarylene ethers, polyarylenes, polyether ketones, polyether sulfones, polyphosphazenes, and the like, and copolymers thereof and mixtures thereof. More preferred are polyimides, polyarylenes, polyether ketones, polyether sulfones, and these copolymers and mixtures and the like. Still more preferred are polyarylenes, polyether ketones, polyether ketones, and copolymers thereof and mixtures thereof and the like. Most preferred are polyarylene ethers.

Into these polymers may have been introduced other ion exchange groups in addition to ion exchange groups introduced by the method described below. The ion exchange groups include the same groups as the ion exchange groups having the above mentioned polymer electrolytes.

Next, a method for producing a crosslinked polymer electrolyte of the present invention will be set forth.

A crosslinked polymer electrolyte of the present invention can be produced by mixing the above compound having two or three or more reactive groups (hereinafter, sometimes called a crosslinking reagent) and a polymer electrolyte or polymer and heating.

As described in the explanation of the method of producing the crosslinked polymer electrolyte membrane described later, a temperature for heating is preferably in the range from 50° C. to 300° C., and an acidic catalyst is preferably made to be present when heating.

An amount of a crosslinking agent used is, as a ratio of the amount of polymer electrolyte or polymer, normally (mass of crosslinking agent)/(mass of polymer electrolyte or mass of polymer)=0.0050 to 0.50 (g/g), preferably from 0.010 to 0.30 (g/g), more preferably from 0.020 to 0.20 (g/g).

Although the method of mixing a crosslinking agent and polymer electrolyte or polymer can also make use of a method of mixing a polymer electrolyte in a solid state or a polymer and a crosslinking agent in a solid or liquid state, for efficient crosslinking, it is preferable to use a method of mixing by dissolving the polymer electrolyte or polymer in a solvent in order to uniformly blend them with a crosslinking agent.

A crosslinked polymer electrolyte or polymer of the present invention can be also produced in a powder or bulk form for use, and is normally used in a membrane state when a crosslinked polymer electrolyte of the present invention is used as a fuel cell diaphragm.

In the method for producing a crosslinked polymer electrolyte membrane of the present invention, since it is difficult to mold a polymer electrolyte or polymer after crosslinking, it is preferable to use a method of dissolving a crosslinking agent in a uncrosslinked state into a solvent, forming a membrane from the resultant solution (mixture) and then crosslinking. This membrane-forming method is called a solution cast method.

Specifically, a polymer electrolyte or polymer and crosslinking agent are dissolved in an appropriate solvent, the resultant solution is applied onto a glass plate in a flow-extended fashion, and then the solvent is removed to thereby form a membrane.

The solvent used for membrane forming is not particularly limited so long as the solvent can dissolve a polymer electrolyte or polymer and then can be removed, and examples of the solvent that can be suitably used include aprotic polar solvents such as N,N-dimethylformamide, N,N-dimethylacetoamide, N-methyl-2-pyrolidone and dimethyl sulfoxide, or chlorinated solvents such as dichloromethane, chloroform, 1,2-dichloroethane, chlorobenzene and dichlorobenzene, alcohols such as methanol, ethanol and propanol, and alkylene glycohol monoalkyl ethers such as ethylene glycol monomethyl ether, ethylene glycol monoethyl ether, propylene glycol monomethyl ether and propylene glycol monoethyl ether.

These can also be used alone, and as required, two or more solvents can be mixed for use. Of these, preferred are dimethylformamide, dimethylacetoamide, N-methylpyrolidone and dimethylsulfoxide because of their high solubility of polymer electrolytes.

When a polymer is used in the above, an ion exchange group is further introduced into a resultant crosslinked polymer membrane. The methods include, for example, a method of contacting a crosslinked polymer membrane with an ion exchange group introducing agent to introduce the ion exchange group. The ion exchange group introducing agents preferably include a sulfonic acid group introducing agent and more preferably include concentrated sulfuric acid, fuming sulfuric acid, sulfuric anhydride, chlorosulfonic acid and nitrite salts. Additionally, the use of a cyclic sulfate ester also enables the introduction of a sulfoalkyl group. Of these ion exchange group introducing agents, still more preferred are concentrated sulfuric acid, fuming sulfuric acid and chlorosulfonic acid, particularly preferred are concentrated sulfuric acid and fuming sulfuric acid, and most preferred is concentrated sulfuric acid.

When a crosslinked polymer membrane is made contact with an ion exchange group introducing agent, an arbitrary solvent may be coexisted or not coexisted. The solvents include alcohol solvents, ketone solvents, ether solvents, halogenated solvents, sulfoxide solvents, sulfone solvents, amide solvents, aliphatic hydrocarbon solvents, aromatic hydrocarbon solvents, carbonate esters, esters, nitriles, mixtures thereof and solvents into which a fluorine substituent is further introduced. Of these, any solvent is selected as appropriate.

The alcoholic solvents include methanol, ethanol, isopropanol, butanol, and the like; the ketone solvents include acetone, methylisobutyl ketone, methyl ethyl ketone, benzophenone, and the like.

The ether solvents include diethyl ether, dibutyl ether, diphenyl ether, tetrahydrofuran (hereinafter, abbreviated as THF), dioxane, dioxolane, ethylene glycol monomethyl ether, ethylene glycol monoethyl ether, propylene glycol monomethyl ether, propylene glycol monoethyl ether, and the like.

The halogenated solvents include chloroform, dichloromethane, 1,2-dichloroethane, 1,1,2,2-tetrachloroethane, chlorobenzene, dichlorobenzene, and the like; the sulfoxide solvents include dimethyl sulfoxide (hereinafter, abbreviated as DMSO).

The sulfone solvents include diphenyl sulfone, sulfolane, and the like; the amide solvents include N,N-dimethylacetamide (hereinafter abbreviated as DMAC), N-methylacetamide, N,N-dimethylformamide (hereinafter abbreviated as DMF), N-methylformamide, formamide, N-methylpyrolidone (hereinafter abbreviated as NMP), and the like.

The aliphatic hydrocarbon solvents include pentane, hexane, heptane, octane, and the like; the aromatic hydrocarbon solvents include benzene, toluene, xylene and the like.

The carbonate esters include propylene carbonate, ethylene carbonate, dimethyl carbonate, diethyl carbonate, ethylmethyl carbonate, 4-trifluoromethyl-1,3-dioxolane-2-one, 1,2-di(methoxycarbonyloxy)ethane, and the like; the ethers include methyl formate, methyl acetate, γ-butyrolactone, and the like; the nitriles include acetonitrile, butyronitrile, and the like.

The solvents in the present invention preferably include ether solvents, halogen solvents, aliphatic hydrocarbon solvents, aromatic hydrocarbon solvents, mixtures thereof and the solvents into which a fluorine substituent is further introduced, more preferably include halogenated solvents, aliphatic hydrocarbon solvents, aromatic hydrocarbon solvents, mixtures thereof and the solvents into which a fluorine substituent is further introduced, and particularly preferably include halogenated solvents.

A temperature when the crosslinked polymer membrane and ion exchange group introducing agent are contacted is normally from −50 to 200° C., preferably from −10 to 150° C., more preferably from 0 to 100° C.

A time for contacting the crosslinked polymer membrane and the ion exchange group introducing agent are contacted is normally from 5 minutes to 100 days, preferably from 1 hour to 80 days, and more preferably from 1 day to 50 days.

The membrane after being in contact with the ion exchange group introducing agent may be used after it is washed with an arbitrary solvent or water.

A thickness of the membrane obtained by forming from a mixture of a polymer electrolyte or polymer and a crosslinking agent is not particularly limited and is preferably from 10 to 200 μm. In order to obtain strength of a membrane durable for practical uses, the membrane thickness is preferably larger than 10 μm, and in order to reduce membrane resistance, i.e., improve power generation performance, the membrane is preferably thinner than 200 μm. The membrane thickness can be controlled by solution concentration or the thickness of application of the solution to a substrate.

The membrane of a mixture of a polymer electrolyte and a crosslinking agent obtained in this manner can be crosslinked by heating. A temperature for heating is normally from 50° C. to 300° C., preferably from 80° C. to 250° C., more preferably from 100° C. to 200° C.

Additionally, a time for heating is normally from 10 minutes to 10 hours, preferably from 20 minutes to 7 hours, more preferably from 30 minutes to 5 hours.

An acid catalyst can be made to coexist in order to promote crosslinking during a heat treatment. Compounds of general acids can be widely used as the acid catalysts and preferably include sulfonic acid compounds, carboxylic acid compounds, boric acid compounds, phosphoric acid compounds, hydrochloric acid, sulfuric acid and nitric acid, more preferably sulfonic acid compounds, particularly preferably methanesulfonic acid, ethanesulfonic acid, trifluoromethanesulfonic acid and pentafluoroethanesulfonic acid.

An amount of the acid catalyst is not particularly limited, and for example (mass of acid catalyst)/(mass of crosslinking agent)=0.0050 to 0.50 (g/g), preferably from 0.010 to 0.30 (g/g), more preferably from 0.020 to 0.20 (g/g).

Methods of coexisting the acid catalyst during a heat treatment include a method of, for example, dissolving an acid catalyst in a solution of a polymer electrolyte or polymer and crosslinking agent and then subjecting the resulting solution to cast membrane formation and a heat treatment, and the like. Whether or not the membrane after the heat treatment is crosslinked can be determined by whether or not the membrane after the heat treatment dissolves in the solvent in which the membrane prior to the heat treatment is dissolved. If the membrane after heat treatment dissolves in the solvent, the membrane is determined not to be crosslinked; when the membrane after heat treatment does not dissolve in the solvent or swells but does not dissolve, the resultant membrane can be determined to be crosslinked ("Essential Polymer Science" published by Kodansha LTD., pp. 59-60, 1988).

A cell, particularly a fuel cell, of the present invention will be set forth in the following.

A crosslinked polymer electrolyte membrane-electrode assembly is characterized by using the above polymer electrolyte membrane and electrode.

In addition, a cell of the present invention is characterized by using at least one of the above crosslinked polymer electrolyte, crosslinked polymer electrolyte membrane, and crosslinked polymer electrolyte membrane-electrode assembly, and is particularly suitably used for fuel cells.

A fuel cell of the present invention can be produced by assembling a conductive material as a catalyst and a collector to both faces of a crosslinked polymer electrolyte membrane of the present invention.

The catalyst is not particularly limited so long as it can activate oxidation reduction reaction with hydrogen or oxygen, and known catalysts can be used, and particulates of platinum, which are preferably used.

Particulates of platinum are loaded on particulate or fibrous carbon such as activated carbon or graphite and are preferably used.

A conductive matter as a collector can also use a known material, and porous carbon unwoven cloth or carbon paper is preferred for efficient transportation of a raw material gas to a catalyst.

A method of assembling platinum particulates or carbon loaded on platinum particulates to porous carbon unwoven cloth or carbon paper and a method of assembling it to a polymer electrolyte membrane can use known methods such as the method described in, for example, J. Electrochem. Soc.: Electrochemical Science and Technology, 1988, 135 (9), 2209.

In the above, embodiments of the present invention have been described; however, the embodiments of the invention disclosed above are simply illustrations and the scope of the present invention is not limited to these embodiments.

The present invention will be set forth in reference to examples in the following; however, the invention is by no means limited to these examples.

Additionally, the evaluations of membrane characteristics were carried out by the following methods, unless otherwise indicated.

(1) Evaluation of Fuel Cell Characteristics A

A platinum catalyst loaded on carbon was mixed with a lower alcohol solution (10 wt % water content) of Nafion (registered trade mark of E.I.DuPont) to make paste. The paste was applied to porous carbon cloth as an electrode material and dried to obtain a collector as an electrode material on which a catalyst is fixed. This collector was laminated on both the faces of a membrane to obtain a collector-membrane assembly. One face of the assembly was flowed with humidified oxygen gas and the other face was flowed with humidified hydrogen gas. The assembly was kept at 80° C. and its power generation characteristics were determined for the evaluation.

(2) Evaluation of Fuel Cell Characteristics B

A membrane electrode assembly was prepared in accordance with the method described in Japanese Patent Application Laid-Open No. 2004-319139. However, as an electrode ink, an ink produced by adding ethanol to a platinum-ruthenium catalyst loaded on carbon and a 5 wt % Nafion solution (solvent: a mixture of water and a lower alcohol) available from Aldrich Inc. is used for an anode and an ink produced by adding ethanol to a platinum catalyst loaded on carbon and a 5 wt % Nafion solution (solvent: a mixture of water and a lower alcohol) available from Aldrich Inc. is used for a cathode. The amount of application was adjusted in such a way that the platinum-carried amount for each of the faces of the anode and cathode was 1.0 mg/cm$^2$. In addition, as diffusion layers, carbon paper was used for the anode, and carbon cloth was used for the cathode. The assembly was kept at 80° C., the anode was flowed with a 30 wt % aqueous methanol solution, the cathode was flowed with non-humidified air gas, and its power generation characteristics were determined for the evaluation.

(3) Determination of Methanol Permeation Coefficient

A polymer electrolyte membrane for measuring was pinched in the center of an H-shaped diaphragm cell comprised of cells A and B, a 10 wt % aqueous methanol solution was placed in cell A and purified water was placed in cell B; at 23° C. the methanol concentrations in cells A and B after a period of time were analyzed and a methanol permeation coefficient D (cm$^2$/sec) was found by the following equation:

$$D=\{(V \times l)/(A \times t)\} \times \ln\{(C_1-C_m)/(C_2-C_n)\}$$

wherein,

V: volume of solution in cell B (cm$^3$),
l: membrane thickness of electrolyte membrane (cm),
A: cross sectional area of electrolyte membrane (cm$^2$),
t: time (sec),
$C_1$: solute concentration in cell B at t=1 (mol/cm$^3$),
$C_2$: solute concentration in cell B at t=2 (mol/cm$^3$),
$C_m$: solute concentration in cell A at t=1 (mol/cm$^3$),
$C_n$: solute concentration in cell A at t=2 (mol/cm$^3$),
and herein the methanol permeation amount is sufficiently small, thus V was set at a constant value at the initial purified water volume and $C_m=C_n$, which was set at the initial concentration (10 Wt %).

(4) Water Uptake

A dried film was immersed in deionized water at 100° C. for two hours, and then the increased amount of film weight was evaluated on the basis of its dried weight.

(5) Determination of Proton Conductivity (σ)

On the surface of a rectangular membrane sample having a width of 1.0 cm were pressed platinum plates (width: 5.0 mm) such that the interval of the platinum plates was 1.0 cm, and then the sample was kept in a thermohumidistat having a temperature of 80° C. and a relative humidity of 90%. An alternating current impedance at from 10$^6$ to 10$^{-1}$ Hz between the platinum plates was measured and the proton conductivity was found by the following equation.

$$\sigma(S/cm) = 1/(R \times d)$$

wherein, on the cole-cole plot, when the imaginary part of the complex impedance is 0, the real part of the complex impedance is set to be R(Ω), and d represents a membrane thickness (cm).

(6) Determination of Ion Exchange Capacity

It was evaluated by the titration method.

REFERENCE EXAMPLE 1

0.98 g of anhydrous copper chloride and 1.17 g of N,N,N', N'-tetramethylethylenediamine were placed in 500 ml of chlorobenzene and stirred in the atmosphere at room temperature for 60 minutes. Thereto were added 2.84 g of 4,4'-(1-methylethylidene)bis(2,6-dimethylphenol) and 49.3 g of 2,6-diphenylphenol, and the resulting material was stirred at 40° C. for 10 hours while air was blown into the material. The reaction solution was poured into hydrochloric acid-containing methanol to precipitate a polymer. The resulting material was filtrated and dried to obtain poly(2,6-diphenylphenylene ether) (a).

REFERENCE EXAMPLE 2

A flask was charged with 1000 g of SUMIKA EXCEL PES4003P (available from Sumitomo Chemical Co., Ltd., hydroxyl group-terminated polyether sulfone having a number average molecular weight of 25000 in terms of polystyrene determined by GPC using dimethylacetamide as the mobile phase), 7.59 g of potassium carbonate, 2500 ml of N,N-dimethylacetamide (hereinafter, abbreviated as DMAc) and 500 ml of toluene in a nitrogen atmosphere, and the resulting material was heated to 160° C. and stirred and subjected to azeotropic dehydration. After the resulting material was cooled at room temperature, 53.6 g of decafluorobiphenyl was added thereto, and the resulting material was heated to 80° C. and stirred for 3.5 hours.

After cooling, the reaction solution was added dropwise to a large amount of water and the resulting precipitate was filtrated and recovered. The substance was washed with a methanol/acetone mixture solvent, and then dried at 80° C. to obtain a polymer (b) having a nonafluorobiphenoxy group on its terminal.

REFERENCE EXAMPLE 3

A flask equipped with an azeotropic distillation device were charged with 160 g of the above (a), 640 g of the above (b), 32 g of potassium carbonate, 3500 ml of DMAc and 200 ml of toluene, and the resulting material was heated to 80° C., 100° C. and 120° C. and stirred for 1 hour at each temperature, and to 140° C. and stirred for 3.5 hours while the toluene was evaporation-removed under an argon flow. The reaction solution was added dropwise to a large amount of hydrochloric acid-acidic methanol, and the resulting precipitate was filtrated and recovered and then dried at 80° C. under reduced pressure to obtain a block copolymer.

682 g of the resulting block copolymer was dissolved in 6 L of 98% sulfuric acid, and sulfonation reaction was carried out at 40° C. for 100 hours. The resulting solution was added dropwise to a large amount of ice water, and the resulting precipitate was filtrated and recovered. After the precipitate was ground to a powder, washing with ion exchanged water was repeated until the wash liquid became neutral. Further, the powder was immersed in ion exchanged water and cleaned with hot water at 95° C. for 3 hours to recover the powder by filtration. The same hot water washing and filtration were repeated once more, and then dried at 40° C. to obtain a polymer electrolyte (c).

EXAMPLE 1

2.0 g of polymer electrolyte (c) and 0.20 g of 2,6-bis (hydroxymethyl)-p-cresol as a crosslinking agent were dissolved in 10 ml of DMAc to be homogenized. The obtained solution was applied onto a glass plate by flow casting and the DMAc was evaporation-removed at 80° C. at atmospheric pressure to form a membrane. On this membrane, a heat treatment was carried out at 100° C. for one hour and at 150° C. for three hours to obtain a membrane (d). A part of membrane (d) after heating was sampled and immersed in DMAc. However, it was not dissolved therein at all, and thus it was confirmed that the membrane (d) was crosslinked. The test results of the methanol permeability and water uptake measurement of (d) are shown in Table 1.

COMPARATIVE EXAMPLE 1

2.00 g of the polymer electrolyte (c) was dissolved in DMAc to be homogenized. This solution was applied onto a glass plate by flow casting and the DMAC was evaporation-removed at 80° C. at atmospheric pressure to form a membrane. On this membrane, a heat treatment was carried out at 100° C. for one hour and at 150° C. for three hours to obtain a membrane (e). A part of the membrane (e) after heating was sampled and immersed in DMAc; as a result, the sample was readily dissolved therein. Thus, it was confirmed that the membrane (e) was in a non-crosslinked state. The test results of the methanol permeability and water uptake measurement of (e) are shown in Table 1.

COMPARATIVE EXAMPLE 2

The methanol permeability test and water uptake measurements of Nafion 115 available from Aldrich Inc. are carried out. The results are shown in Table 1.

TABLE 1

| | Water uptake (%) | Permeation coefficient of methanol | |
|---|---|---|---|
| | | Permeation coefficient ($cm^2/s$) | Relative value (based on 1.00 of Comparative Example 2) |
| Example 1 | 30.5 | $2.1 \times 10^{-7}$ | 0.17 |
| Comparative Example 1 | 55.0 | $3.4 \times 10^{-7}$ | 0.28 |
| Comparative Example 2 | 32.0 | $1.2 \times 10^{-6}$ | 1.00 |

EXAMPLE 2

The fuel cell operation test was performed on (d). The result is shown in Table 2.

COMPARATIVE EXAMPLE 3

The fuel cell operation test of (e) was performed. The result is shown in Table 2.

TABLE 2

| | Fuel cell operation test A Current density at 0.20 V of voltage |
|---|---|
| Example 2 | 681 mA/$cm^2$ |
| Comparative Example 3 | 678 mA/$cm^2$ |

REFERENCE EXAMPLE 4

A flask equipped with an azeotropic distillation device were charged with 247.6 g of 4,4'-difluorodiphenyl sulfone, 164.4 g of 2,6-dihydroxynaphthalene (Dainippon Ink And Chemicals, Inc.), 902 g of N-methylpyrolidone, 902 g of dimethylsulfoxide (DMSO) and 294 g of toluene in an argon atmosphere, and the argon gas was bubbled for 1 hour while the resulting material was stirred at room temperature. Thereafter, 156.1 g of potassium carbonate was added thereto and the resulting material was heated to 140° C. and stirred and subjected to azeotropic dehydration. Then, the resulting material was continuously heated while the toluene was evaporation-removed to obtain a polymer (f). The total heating time was 16 hours. The reaction solution of the resulting polymer (f) was left to cool at room temperature, and then used for the next reaction.

A flask equipped with an azeotropic distillation device were charged with 283.7 g of dipotassium 4,4'-difluorodiphenylsulfone-3,3'-disulfonate, 120.0 g of potassium 2,5-dihydroxybenzenesulfonate (Mitsuboshi Chemical Co., Ltd.), 1778 g of DMSO and 279 g of toluene in an argon atmosphere, and the argon gas was bubbled for 1 hour while the resulting material was stirred at room temperature. Thereafter, 76.3 g of potassium carbonate was added thereto and the resulting material was heated to 140° C. and stirred and subjected to azeotropic dehydration. Then, the resulting material was continuously heated while the toluene was evaporation-removed to obtain a polymer (g). The total heating time was 18.5 hours. The reaction solution of the resulting polymer (g) was cooled to room temperature, and then directly used for the next step.

Thereafter, to the reaction solution of the resulting polymer (g) were added the total amount of the polymer (f), 610 g of DMSO and 1790 g of NMP while the reaction solution was stirred, and then the resulting material was heated to 150° C. and stirred for 39.5 hours.

After the reaction solution was allowed to cool, this reaction solution was added dropwise to a large amount of 2N hydrochloric acid and left to immerse therein for one hour. After the precipitate generated in the reaction solution was filtrated, it was again immersed in 2N hydrochloric acid for one hour. The precipitate was filtrated and washed with water, and then immersed in a large amount of hot water at 95° C. for one hour. The resultant precipitate was filtrated and collected. Thereafter, the substance was dried at 80° C. overnight to obtain a polymer electrolyte (h), which is a block copolymer, represented by the following chemical formula (3) below. Additionally, the description "block" in the formula below means that the block copolymer has one or more of each of a segment derived from the first polymer compound and a segment derived from the second polymer compound.

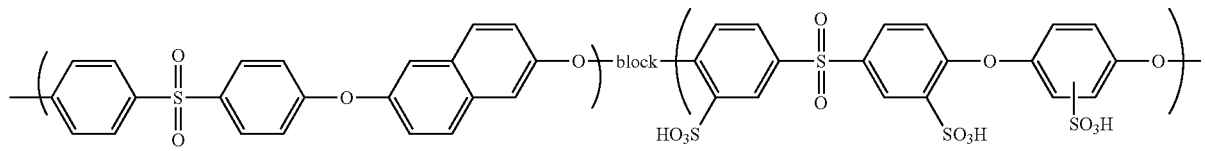

EXAMPLE 3

3.1 g of a polymer electrolyte (h) and 0.62 g of 2,6-bis(hydroxymethyl)-p-cresol as a crosslinking agent were dissolved in 16 ml of NMP to be homogenized. This solution was applied onto a glass plate by flow casting and the NMP was evaporation-removed at 80° C. at atmospheric pressure to form a membrane. On this membrane, a heat treatment was carried out at 150° C. for 2 hour to obtain a membrane (i). 100 mg of the membrane (i) after heating was immersed in a large amount of NMP and heated to 80° C. As a result, 60 mg of insoluble components remains although the shape of the membrane was not maintained, thus it was confirmed that the membrane (i) was crosslinked. The test results of the evaluation of the fuel cell characteristic B, methanol permeability and water uptake measurement of (i) are shown in Table 2.

COMPARATIVE EXAMPLE 4

3.0 g of a polymer electrolyte (h) was dissolved in 16 ml of NMP to be homogenized. This solution was applied onto a glass plate by flow casting, and the NMP was evaporation-removed at 80° C. at atmospheric pressure to form a membrane (j). Then the membrane (j) was immersed in NMP, it was easily dissolved therein, and thus it was confirmed that the membrane (j) was in a non-crosslinked state. The test results of the evaluation of the fuel cell characteristic B, methanol permeability and water uptake measurement of (j) are shown in Table 3.

TABLE 3

| | Water uptake (%) | Fuel cell operation test B Current density (mA/cm$^2$) at 0.20 V of voltage | Permeation coefficient (cm$^2$/s) | Permeation coefficient Relative value (based on 1.00 of Comparative Example 4) |
|---|---|---|---|---|
| Example 3 | 61.9 | 140 | 3.9 × 10$^{-7}$ | 0.33 |
| Comparative Example 4 | 114.7 | 104 | 1.2 × 10$^{-6}$ | 1.00 |

Table 3 shows that the polymer electrolyte membrane of the present invention is also high in fuel cell characteristic and also restrained in methanol permeation.

EXAMPLE 4

A flask was charged with 0.50 g of poly(2,6-diphenylphenylene ether) (available from GL Sciences Inc., trade name: TENAX-TA, hereinafter abbreviated as PDPPE), 0.10 g of 2,6-bishydroxymethyl-p-cresol (hereinafter, abbreviated as BHMC), 10 ml of tetrahydrofuran (hereinafter abbreviated as THF) and 50 mg of methanesulfonic acid to form a homogeneous solution. This solution was poured into a dish and the THF was evaporated at room temperature for 6 hours to obtain a homogeneous membrane.

This membrane was heated at 100° C. for 1 hour, and followed by heated at 150° C. for 3 hours to thereby obtain a crosslinked polymer membrane insoluble in THF.

Subsequently, this membrane was reacted in 25 ml of concentrated sulfuric acid at 40° C. for 7 days, and sufficiently washed with water to obtain a sulfonated crosslinked polymer membrane (A). The evaluation results are indicated in Table 4.

EXAMPLE 5

Sulfonated crosslinked polymer membrane (B) was obtained by the operation in the same manner as Example 1 except that 0.05 g of BHMC was used. The evaluation results are shown in Table 4.

EXAMPLE 6

In a mixture solution of 20 ml of chloroform and 0.50 g of chlorosulfonic acid was immersed 0.30 g of the membrane (A) obtained in Example 3, and the membrane was reacted at 40° C. for 100 hours. The membrane after the reaction was sufficiently washed with water to obtain a sulfonated crosslinked polymer membrane (C). The evaluation results are shown in Table 4

EXAMPLE 7

A sulfonated crosslinked polymer membrane (D) was obtained by the operation in the same manner as Example 5 except that 2 ml of chloroform and 20 ml of concentrated sulfuric acid were used. The evaluation results are shown in Table 4.

EXAMPLE 8

A flask was charged with 1.00 g of PDPPE, 0.10 g of BHMC, 20 ml of THF and 100 mg of methanesulfonic acid to form a homogeneous solution. This solution was poured into a dish and the THF was evaporated at room temperature over 6 hours to obtain a homogeneous membrane. This membrane was heated at 100° C. for 1 hour, and followed by heated at 150° C. for 3 hours to thereby obtain a crosslinked polymer membrane insoluble in THF.

Subsequently, this membrane was reacted in a mixture solvent of 50 ml of concentrated sulfuric acid and 2 ml of chloroform at 40° C. for 40 days, and sufficiently washed with water to obtain a sulfonated crosslinked polymer membrane (E). The evaluation results are indicated in Table 4.

TABLE 4

| | IEC (meg/g) | Water uptake (%) | Proton conductivity A (S/cm) |
|---|---|---|---|
| Example 4 | 0.32 | 14 | 4.9 × 10$^{-4}$ |
| Example 5 | 0.56 | 21 | 3.3 × 10$^{-3}$ |
| Example 6 | 0.76 | 35 | 4.3 × 10$^{-3}$ |
| Example 7 | 2.00 | 100 | 9.1 × 10$^{-2}$ |
| Example 8 | 2.59 | 109 | 2.5 × 10$^{-2}$ |

The crosslinked polymer electrolyte of the present invention can be readily produced and is useful for a proton conductive membrane material, i.e., a polymer electrolyte, for solid polymer fuel cells using gas fuels such as hydrogen gas and liquid fuels such as methanol and dimethyl ether.

In particular, as compared with a non-crosslinked membrane, the polymer of the invention can restrain methanol permeability, is excellent in water resistance, solvent resistance etc., and thus is also advantageous in view of practical uses.

The invention claimed is:
1. A crosslinked polymer electrolyte obtained by the following (1) or (2):
   (1) reacting a compound having two or three or more reactive groups with a polymer electrolyte, or

(2) reacting a compound having two or three or more reactive groups with a polymer to obtain a crosslinked polymer, and introducing an ion exchange group into the resultant crosslinked polymer;

wherein the compound having two or three or more reactive n groups is at least one compound selected from the group consisting of the following formulae (i-1) to (i-5):

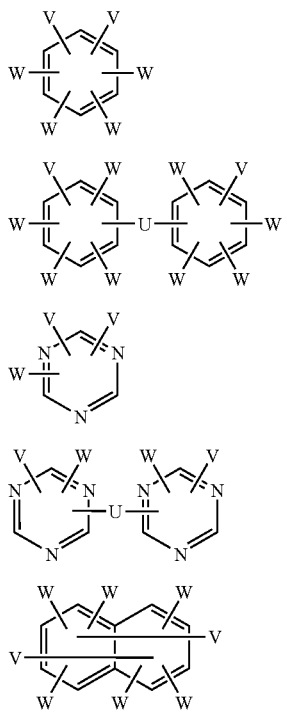

wherein, in formulae (i-1) to (i-5), V represents a reactive group, and W represents a hydrogen atom, a substituent or a reactive group; in each formula, a plurality of Vs may be the same or different from each other; in each formula, a plurality of Ws may be the same or different from each other; and U represents direct bond or a divalent group; and wherein the polymer electrolyte includes a block copolymer having one or more blocks into which a sulfonic acid group is introduced and one or more blocks into which a sulfonic acid group is not substantially introduced, and at least one block of all the blocks has an aromatic ring in the main chain thereof.

2. The crosslinked polymer electrolyte of claim 1, wherein the compound having two or three or more reactive groups is reacted with the polymer electrolyte or the polymer in the temperature range from 50 to 300° C.

3. The crosslinked polymer electrolyte of claim 2, wherein the compound having two or three or more reactive groups is reacted with the polymer electrolyte or the polymer in the temperature range from 100 to 200° C.

4. The crosslinked polymer electrolyte of claim 1, wherein a ratio of a crosslinking agent is from 0.5 to 50 wt % based on the amount of the polymer or the polymer electrolyte.

5. The crosslinked polymer electrolyte of claim 1, wherein the compound having two or three or more reactive groups is reacted with the polymer electrolyte or the polymer in the presence of an acid catalyst.

6. The crosslinked polymer electrolyte of claim 1, wherein V is each independently a halogen atom, hydroxymethyl group, alkoxymethyl group, vinyl group, allyl group, halogenated methyl group, alkoxymethylamino group, bis(alkoxymethyl)amino group, halogenated acyl group, isopropenyl group, or allyloxy group.

7. The crosslinked polymer electrolyte of claim 1, wherein W is each independently a halogen atom, hydrogen atom, hydroxymethyl group, alkoxymethyl group, vinyl group, allyl group, halogenated methyl group, alkoxymethylamino group, bis(alkoxymethyl)amino group, halogenated acyl group, isopropenyl group, allyloxy group, hydroxyl group, carboxylic acid group, sulfonic acid group, amino group, amide group, nitro group, aldehyde group, nitrile group, ester group, alkyl group having 1 to 6 carbon atoms that may have a substituent, aryl group having 6 to 20 carbon atoms that may have a substituent, or aralkyl group having 7 to 20 carbon atoms that may have a substituent.

8. The crosslinked polymer electrolyte of claim 1, wherein U is each independently direct bond, —O—, —S—, —CO—, —COO—, —SO$_2$—, —SO$_3$—, a phenylene group, biphenylylene group, anthrylene group, naphthylene group, aralkylene group having 7 to 12 carbon atoms, alkylene group having 1 to 20 carbon atoms, alkyleneoxy group having 1 to 20 carbon atoms, or alkylenesulfide group having 1 to 20 carbon atoms.

9. The crosslinked polymer electrolyte of claim 6 or 7, wherein at least two of Vs are hydroxymethyl groups, and each W is a hydroxyl group.

10. The crosslinked polymer electrolyte of claim 9, wherein the compound having two or three or more reactive groups is 2,6-bis(hydroxymethyl)phenol or derivatives thereof.

11. The crosslinked polymer electrolyte of claim 1, wherein the ion exchange group is a cation exchange group.

12. The crosslinked polymer electrolyte of claim 11, wherein the cation exchange group is a sulfonic acid group.

13. The crosslinked polymer electrolyte of claim 12, wherein the sulfonic acid group is introduced thereinto by use of a sulfonating agent selected from concentrated sulfuric acid, chlorosulfonic acid and fuming sulfuric acid.

14. The crosslinked polymer electrolyte of claim 12, wherein a halogenated solvent is coexisted when the sulfonic acid group is introduced thereinto.

15. A crosslinked polymer electrolyte membrane comprising the crosslinked polymer electrolyte of claim 1.

16. A crosslinked polymer electrolyte membrane-electrode assembly comprising an electrode and a crosslinked polymer electrolyte membrane comprising the crosslinked polymer electrolyte of claim 1.

17. A cell comprising a crosslinked polymer electrolyte membrane-electrode assembly comprising an electrode and a crosslinked polymer electrolyte membrane comprising the crosslinked polymer electrolyte of claim 1.

18. A fuel cell comprising a crosslinked polymer electrolyte membrane-electrode assembly comprising an electrode and a crosslinked polymer electrolyte membrane comprising the crosslinked polymer electrolyte of claim 1.

* * * * *